United States Patent
Goldshtein et al.

(10) Patent No.: US 6,387,966 B1
(45) Date of Patent: May 14, 2002

(54) METHOD AND COMPOSITION FOR DEVULCANIZATION OF WASTE RUBBER

(76) Inventors: Vadim Goldshtein, P.O. Box 157, Shani, Mobile Post, Har Hevron 90411; Michael Kopylov, David Frishman Street 10, Apt. 22, Beer-Sheva, 84253, both of (IL)

(*) Notice: Subject to any disclaimer, the term of this patent is extended or adjusted under 35 U.S.C. 154(b) by 0 days.

(21) Appl. No.: 09/861,784

(22) Filed: May 21, 2001

(51) Int. Cl.$^7$ .................................................. C08J 11/04
(52) U.S. Cl. .......................................... 521/41; 521/43.5
(58) Field of Search .......................... 521/40, 40.5, 41, 521/43, 43.5, 44; 525/339, 368, 372, 386

(56) References Cited

U.S. PATENT DOCUMENTS

| | | | |
|---|---|---|---|
| 4,104,205 A | 8/1978 | Novotny | 260/2.3 |
| 4,129,768 A | 12/1978 | Anderson | 219/10.55 |
| 4,161,464 A | 7/1979 | Nicholas | 260/2.3 |
| 4,459,450 A | 7/1984 | Tyler | 219/10.55 |
| 4,506,034 A | 3/1985 | Munih | 521/41 |
| 5,258,413 A | 11/1993 | Isayev | 521/45.5 |
| 5,275,948 A | 1/1994 | Straube | 435/262 |
| 5,284,625 A | 2/1994 | Isayev | 422/128 |
| 5,602,186 A | 2/1997 | Myers | 521/41 |
| 5,623,007 A * | 4/1997 | Kuebler | 524/105 |
| 5,677,354 A * | 10/1997 | Olivera Da Cunha Lima | 521/41 |
| 5,683,498 A | 11/1997 | Hesp | 106/273.1 |
| 5,731,358 A | 3/1998 | Pillai | 521/41 |
| 5,798,394 A | 8/1998 | Myers | 521/42.5 |
| 5,799,880 A | 9/1998 | Roberson | 241/1 |
| 5,883,139 A * | 3/1999 | Wideman et al. | 521/43.5 |
| 5,891,926 A | 4/1999 | Hunt | 521/41 |
| 5,955,035 A | 9/1999 | Dinzburg | 422/128 |
| 6,060,528 A * | 5/2000 | Wertz | 521/41 |
| 6,077,874 A * | 6/2000 | Wideman et al. | 521/42.1 |
| 6,095,440 A | 8/2000 | Roberson | 241/1 |
| 6,129,877 A | 10/2000 | Kuc | 264/210.2 |
| 6,133,413 A * | 10/2000 | Mouri et al. | 528/481 |
| 6,245,822 B1 * | 6/2001 | Terada et al. | 521/49 |

* cited by examiner

*Primary Examiner*—Edward J. Cain
*Assistant Examiner*—Katarzyna Wyrozebski-Lee
(74) *Attorney, Agent, or Firm*—Steven Horowitz

(57) ABSTRACT

Mechanical/chemical method and composition for de-vulcanization of rubber maintains the macromolecules, renders sulfur passive for later re-vulcanization, is cost effective, environmentally friendly and produces high quality de-vulcanized rubber to replace virgin rubber. Waste rubber is shredded, crushed and metal-removed. Modifying composition is added as the particles of shredded waste rubber are poured between two rollers that further crush the particles. The modifying composition is a mixture of (1) a proton donor that selectively breaks the sulfur bonds and renders the sulfur passive, (2) a metal oxide and (3) an organic acid that build new bonds between macromolecules for later re-vulcanization, (4) an inhibitor that prevents re-attachment of sulfur radicals with each other before the proton donor attaches itself to the sulfur and (5) a friction agent that prevents sliding of the waste rubber between the rollers. The particles are subjected to at least ten sets of rollers.

52 Claims, 2 Drawing Sheets

METHOD AND COMPOSITION FOR DEVULCANIZATION OF WASTE RUBBER

The field of this invention is the de-vulcanization of rubber and more particularly a mechanical and chemical process and composition for such de-vulcanization.

BACKGROUND OF THE INVENTION

The need to de-vulcanize used rubber stems from at least two considerations. First, waste rubber in the form of used tires is an international environmental and ecological problem and a commercial problem. In particular, every year at least 20 million used automobile tires worldwide become unusable. No more than 30 to 40% of these 20 million tires are subjected to treatment for secondary usage. The remainder, at least 12 to 14 million automobile tires, remains in dumps or is burnt in incinerators and actively pollutes the environment. The hazards of rubber decomposition from used tires in tire dumps are well known—they include the contamination of the water and soil and the breeding of mosquitoes.

Second, it is necessary to de-vulcanize waste rubber before using it as a starting material for products containing rubber. This is because rubber in its vulcanized state cannot bond effectively with ingredients such as tar, mineral oil, synthetic rubber, sulfur, etc. that are used to form rubber products and because rubber in its vulcanized state cannot be molded effectively into the form needed for the final rubber product. It is necessary to use virgin rubber (rubber that has never been vulcanized) or de-vulcanized rubber as the primary raw material for rubber products. Notwithstanding the widely recognized need to conduct the process of de-vulcanization, and to have a cost effective raw material for use in manufacturing of rubber products, the de-vulcanization processes currently used suffer from many drawbacks and the common use of virgin rubber as the starting material for rubber manufacturing is unnecessarily expensive.

Various known methods of de-vulcanization include thermal, ultrasonic, mechanical, chemical/thermal, biotechnological and microwave methods. See, e.g. U.S. Pat. Nos. 6,129,877, 6,095,440, 5,955,035, 5,891,926, 5,799,880, 5,798,394, 5,731,358, 5,683,498, 5,602,186, 5,284,625, 5,275,948, 5,258,413, 4,506,034, 4,459,450, 4,161,464, 4,129,768 and 4,104,205. All of these known methods either involve large energy consumption, expensive raw materials, complicated equipment, toxic reagants and/or toxic byproducts, have de-vulcanization properties that are not industrially acceptable or in one case is usable only for special types of rubber not including tires. As a result, the cost of known methods of de-vulcanization is approximately $500 to $600 per metric ton of end product, a cost that can be substantially reduced if better methods were known.

The cost per metric ton of producing devulcanized waste ruber for secondary usage varies with the type of product that the waste rubber was originally used as and how it was treated during de-vulcanization. The cheapest de-vulcanized waste rubber is rough rubber crumb and small rubber flinders up to 50 millimeters. The most expensive is rubber regenerate from which is produced the most technologically interesting and highest quality rubber products. Regenerate rubber cost up to $600 to $650 per metric ton to produce, according to known methods.

Another disadvantage is that the end product of known de-vulcan ization methods is not high quality rubber usable as the starting raw material in the manufacture of rubber products and is used as a filler instead. The starting material for rubber products is raw rubber that was never vulcanized, sometimes called virgin rubber. Virgin rubber, however, requires the addition of many ingredients, e.g., sulfur, tar, carbon black, mineral oil to make usable rubber products. This occurs under conditions of heat during vulcanization. If de-vulcanized rubber could be made more cost effectively and of sufficient high quality then de-vulcanized rubber could be used as the starting process of rubber products in place of virgin rubber without having to add tar, carbon black, sulfur, oil or other ingredients.

Another disadvantage of some methods of de-vulcanization is that it is not long term in the sense that the sulfur remains active in the presence of moderate heat. Consequently, using these methods would cause problems during shipping and storage of the de-vulcanized rubber for later use if exposed to heat from the sun or other sources.

What is needed is a process of de-vulcanizing waste rubber, e.g. used tires, which costs substantially less per metric ton than the known methods of de-vulcanization, produces an end product that is of sufficiently high quality rubber that it can be used as a substitute raw material for virgin rubber in the manufacture of all kinds of rubber products, which uses no toxic reactants and products no toxic byproducts rendering it environmentally friendly and which produces stable enough end product that it does not re-vulcanize prematurely. This would both revolutionize the cost of making rubber products and greatly enhance the quality of the environment. The method and composition of the present invention achieves these objectives as well as others.

SUMMARY OF THE INVENTION

The method of the present invention is a mechanical/chemical method and composition for de-vulcanization of rubber that maintains the macromolecules of waste rubber, renders the sulfur passive for later revulcanization, is cost effective, environmentally friendly and produces high quality de-vulcanized rubber to replace virgin rubber. Waste rubber is shredded, crushed and any metal is removed. Modifying composition is added as the particles of shredded waste rubber are poured between two roll mills that further crush the particles. The modifying composition is a mixture of (1) a proton donor that selectively breaks the sulfur bonds and renders the sulfur passive, (2) a metal oxide and (3) an organic acid that activates new bonds between macromolecules for later revulcanization, (4) an inhibitor that prevents reattachment of sulfur radicals with each other before the proton donor attaches itself to the sulfur and (5) a friction agent that prevents sliding of the waste rubber between rollers of the roll mills. The particles are subjected to at least ten pairs of rollers in at least ten roll mills, examined for consistency and subjected to further sets of roll mills if necessary. It should be understood that a single multi roll mill shall be understood as comprising separate roll mills for each pair of rollers in the multi roll mill. The composition selectively breaks the sulfur to sulfur bonds while allowing the carbon to carbon bonds to remain intact thereby maintaining the integrity of the rubber macromolecules.

IMPORTANT OBJECTS AND ADVANTAGES

The following important objects and advantages of the present invention are:

(1) to provide a method of de-vulcanization of waste rubber such as used tires that is environmentally friendly in that it recycles used tires into raw rubber without using and without emitting any toxic wastes;

(2) to provide a method of de-vulcanization of waste rubber wherein fine grinding of waste rubber is unnecessary;

(3) to provide a de-vulcanization method that creates a stable end-product that does not re-vulcanize prematurely when exposed to moderate heat such as 50 to 70 degrees centigrade;

(4) to provide a de-vulcanization method that is substantially cheaper to produce each metric ton of end product than existing methods;

(5) to provide a de-vulcanization method that provides high quality rubber end product;

(6) to provide a de-vulcanization method and composition wherein the composition is made of ingredients having a weak smell and that do not have an unpleasant smell;

(7) to provide a de-vulcanization composition and method wherein the composition is made of ingredients that are almost water insoluble;

(8) to provide a de-vulcanization method and composition wherein the composition is made of ingredients that are not inflammable;

(9) to provide a de-vulcanization method and composition wherein the composition is made of ingredients that are cheap;

(10) to provide a de-vulcanization method and composition wherein the composition is sufficiently stable that it remains in usable form for at least half a year;

(11) to provide a composition for de-vulcanization wherein the components are environmentally safe for humans and the environment;

(12) to provide a composition for de-vulcanization of rubber which is added to the crushed waste rubber particles in a ratio that is approximately between 3 parts by weight of composition to 100 parts by weight of waste rubber up to approximately 6 parts composition to 100 parts waste rubber and that is ideally 5 parts by weight of composition to 100 parts by weight of waste rubber;

(13) to provide a rubber de-vulcanization method wherein the cross-linkages from the sulfur bonds are broken but the sulfur remains passively in the rubber and can be reactivated upon later exposure to heat during re-vulcanization thereby eliminating or greatly reducing the amount of sulfur that has to added during re-vulcanization;

(14) to provide a method of de-vulcanization that employs chemical and mechanical means in combination;

(15) to provide a de-vulcanization method wherein the chemical ingredients used react instantly when added to the waste rubber and are not detectable thereafter;

(16) to provide a de-vulcanization method that results in an end product that can be re-vulcanized without the addition of anything;

(17) to provide a de-vulcanization method wherein the rubber end product of the method can be a significant ingredient in the manufacturing of rubber-based products such as asphalt mixtures, bitumen coating, water-resistant paints, rubber glues, anticorrosion mixtures, conveyer belts, tractors and heavy equipment, tires for trucks and tractor trailers, elastic coating, hermetic mixtures, pavements, sports arenas, children's play areas and car tires.

(18) to provide a de-vulcanization method employing a composition that leaves intact the carbon to carbon bonds and maintains the integrity of the rubber macromolecules;

(19) to provide a composition for de-vulcanization that generates an active particle with dimensions not more than 10 angstroms and that is active for 10–100 milliseconds;

(20) to provide a composition for de-vulcanization that conducts a chemical attack on sulfur to sulfur bonds and sulfur to carbon bonds;

(21) to provide a composition for de-vulcanization that generates an active particle such that after the active particle joins the polymer macromolecules of rubber, chemical structures do not appear in place of the sulfur to sulfur bonds that have been broken;

(22) to provide a high quality raw material for rubber vulcanization comprising de-vulcanized waste rubber that contains a composition, in which at least approximately 70% of the sulfur to sulfur bonds that existed prior to de-vulcanization of the waste rubber have been broken, in which less than approximately 10% to 15% of the carbon to carbon bonds that existed prior to de-vulcanization of the waste rubber have been broken, which is stable for at least six months, which may be vulcanized by heating to a temperature of approximately 140 degrees Centigrade without adding sulfur, carbon black, tar, mineral oil and/or virgin rubber.

DETAILED DESCRIPTION OF THE PREFERRED EMBODIMENT

Figure 1:
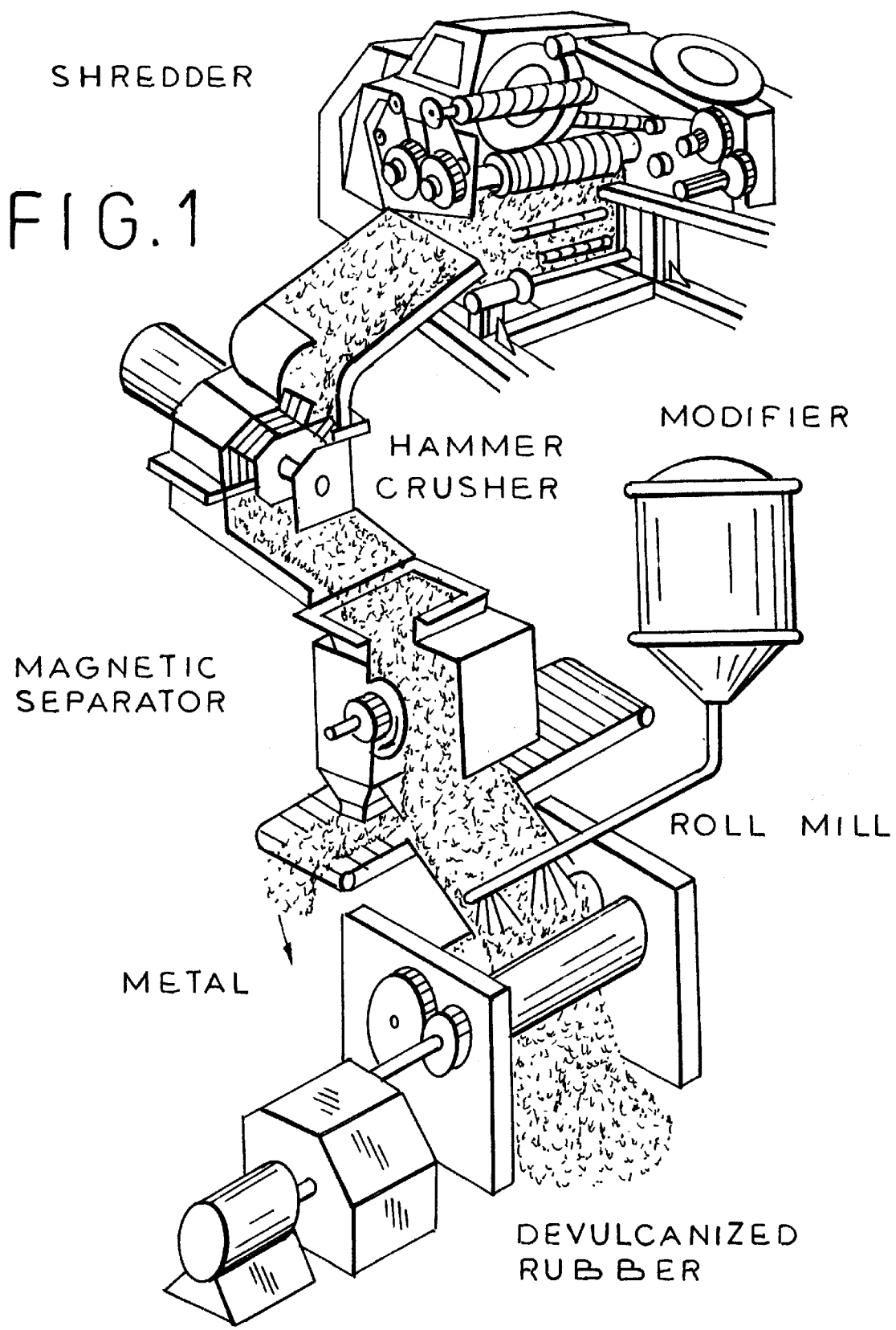
FIG. 1 is a simulation of the steps of the method of the present invention that depicts only one roll mill and omits the other roll mills.

Vulcanized rubber comprises networks of hydrocarbon chains linked together through sulfur to sulfur bonds and can be said to be made of a network of polymer macromolecules. A vulcanized rubber network can be though of as many long hydrocarbon chains wherein the chains themselves are linked together by sulfur to sulfur binds. Consequently, the vulcanized rubber networks contain chemical bonds of carbon to carbon, chemical bonds of carbon to sulfur and chemical bonds of sulfur to sulfur. The strength, measured in Kilocalories per mole of the carbon to carbon bonds is 82.6 Kcal/mol; the strength of the carbon to sulfur bonds is 65.0 Kcalmol and the strength of the sulfur to sulfur bonds is 54.0 Kcal/mol. All three of these bonds are nonpolar, i.e. have dipole moments of zero. Accordingly, a chemical method of de-vulcanization will first damage the sulfur to sulfur bonds in the vulcanized rubber network, then the sulfur to carbon bonds and then the carbon to carbon bonds.

The vulcanized rubber network is sufficiently open that particles having some number of Angstroms ("Å") in dimension may be diffused in the intermolecular space therein. The intermolecular distances in the vulcanized rubber network must also be considered in deciding on an appropriate chemical and mechanical de-vulcanization method. Intermolecular distances can be increased or decreased due to mechanical effects. Hence, mechanical effects on the vulcanized rubber network can facilitate a chemical method of de-vulcanization in that the sulfur to sulfur bonds can be broken more effectively with chemical attacks supplemented by mechanical influences. However, mechanical de-vulcanization is not selective and mechanical de-vulcanization alone or mechanical de-vulcanization that is not sufficiently controlled and limited would result in the carbon to carbon bonds being broken in case of mechanical shear loading. This destruction of the integrity of the vulcanized rubber network would limit the effectiveness of the de-vulcanized rubber as a raw material in later re-vulcanization.

In order to maximize the commercial value of de-vulcanized rubber, the following criteria are set for the chemical agents (and the mechanical influences) used in the de-vulcanization method:

1) The chemical composition must be able to generate an active particle, whether an ion or a free radical, having dimensions not more than ten Angstroms so that it can diffuse throughout the rubber network. Ten Angstroms is the maximum free clearance between macromolecules when the sulfur to sulfur bonds have not been broken. When there is mechanical shear loading of the waste rubber particles by the roll mills, the distance between the two macromolecules is at its maximum and is equal to approximately ten Angstroms. Ten Angstroms is the approximate length of the sulfur to sulfur bond that bridges the macromolecules in the vulcanized rubber network.

2) The active particle should maintain its activity during a period of time equal to from approximately 10 to approximately 100 milliseconds in order to allow the particle to diffuse throughout the vulcanized rubber network.

3) The active particle must attack and break the sulfur to sulfur bonds (which have a strength of 54.0 Kcal/mol) and the carbon to sulfur bonds (which have a strength of Kcalmol of 65.0) but not break the carbon to carbon bonds (which have a strength of 82.6 Kcal/mol).

4) After the active particle physically diffuses throughout the polymer macromolecules, and attaches to the polymer macromolecules and the sulfur to sulfur bonds have been broken, the modifying composition prevents chemical structures from appearing in place of the broken sulfur to sulfur bonds because that would prevent later re-vulcanization or at least would diminish the technical characteristics of any such re-vulcanized material.

As described further below, the composition of the present invention meets and achieves each of the four criteria and in addition achieves de-vulcanization without noticeable disintegration of the polymer chain.

FIG. 1 is presently just to illustrate a simulated graphical representation of the method of the present invention and is not intended to be actual accurate representations of the physical steps being carried out. As seen from FIG. 1, the method of the present invention involves taking waste rubber as the starting ingredient from such things as used tires and the like. Waste rubber from used tires is a vulcanized large chain macromolecule of polymerized rubber. Since the process of vulcanizing rubber involves the addition of sulfur, waste rubber from commercially produced ruber contains sulfur. It should be noted that chemical bonds between the sulfur atoms are referred to herein as "sulfur bonds". Furthermore, the rubber in tires has metal interspersed therein for strength. Accordingly, the starting product contains metal.

In the alternative, the starting product of the method of the present invention is waste rubber from which the metal had already been removed by known methods. In that case, the step presented below of removing the metal from the waste rubber such as magnetic separation, is omitted.

The initial step of the method of de-vulcanization of the present invention involves using any known means of turning the waste rubber into particles of waste rubber. Typically, this is done by shredding and crushing (or grinding) the waste rubber to make particles of waste rubber. The particular methods of shredding and crushing the waste rubber is well known. The next step is to remove any metal by magnetically separating the metal from the particles of waste rubber. This step may have already been performed prior to the beginning the method. In addition, it is immaterial to the method of the present invention whether the metal removal step is done before or after the step of shredding and crushing the waste rubber.

Alternatively, the method of the present invention omits the first two steps. That is, the method commences from particles of waste rubber (waste rubber already made into particles) from which metal has already been removed. Such particles may simply be purchased. In such a case, the method would begin with the following next step.

As best seen from FIG. 1, the next step is to take the particles of waste rubber, subject them to the special composition of the present invention while the particles are being poured into roll mills. The step is to simultaneously add the modifying composition to the particles of waste rubber while the particles of waste rubber are falling as the particles are being poured into an area between two power rollers of a first power roll mill that crushes the particles. For convenience, the end product of this step is called "modified crushed particles". The addition of the modifying composition to the particles of waste rubber results in an immediate chemical reaction with the particles and the result may be termed "modified particle" of waste rubber.

In this step the amount by weight of modifying composition that is being added to the particles of crushed waste rubber is between approximately 3% to approximately 6%, with the optimal being approximately 5%. For example, 50 grams of modifying composition is added to 1 kilogram of particles of crushed waste rubber. The 3% lower limit is recommended to be used for finished rubber products, for example tires, that require the best quality raw materials. However, there may be other finished rubber products, for example rubber mates, tiles, etc. for which the rubber need not be as high quality and consequently the method herein may create a starting material for such products by using less than 3%. Furthermore, the level of quality demanded may vary according to the manufacturer of the rubber product. For this reason, Table 2, below, also includes de-vulcanization samples in which the weight part of the composition is less than 3%.

After the de-vulcanization process of the present invention, due to the chemical reaction, fragments, elements or parts of the modifying composition exist in the rubber in a different form.

The roll mills are standard industrial power roll mills operated at a temperature of less than 70 degrees Centigrade. One roller in the pair or set of rollers in the roll mill is rotating in the opposite direction from its counterpart (if one is clockwise the other is counterclockwise and vice versa) to create the crushing pressure needed and since the they are rotating at different speeds, mechanical shear loading is created. Based on FIG. 2, the following description further details the forces at work on an average sized modified particle of waste rubber when it goes through the sets of rollers in the roll mills. Accordingly, the following quantities are merely assumptions to calculate these forces. Each roller has a radius, R, of 75 centimeters. The front roller turns 18 times per minute (n1) and has a linear speed, v1, of 80 centimeters per second. The rear roller turns 20 times per minute (n2) in an opposite direction and has a linear speed, v2, of 90 centimeters per second. The nip, m, between the front and rear rollers is equal to one hundredth of a centimeter. The particle of waste rubber has a minimum size, Q, of one tenth of a centimeter in each dimension: width, length and height before going through the roll mills.

Figure 2:
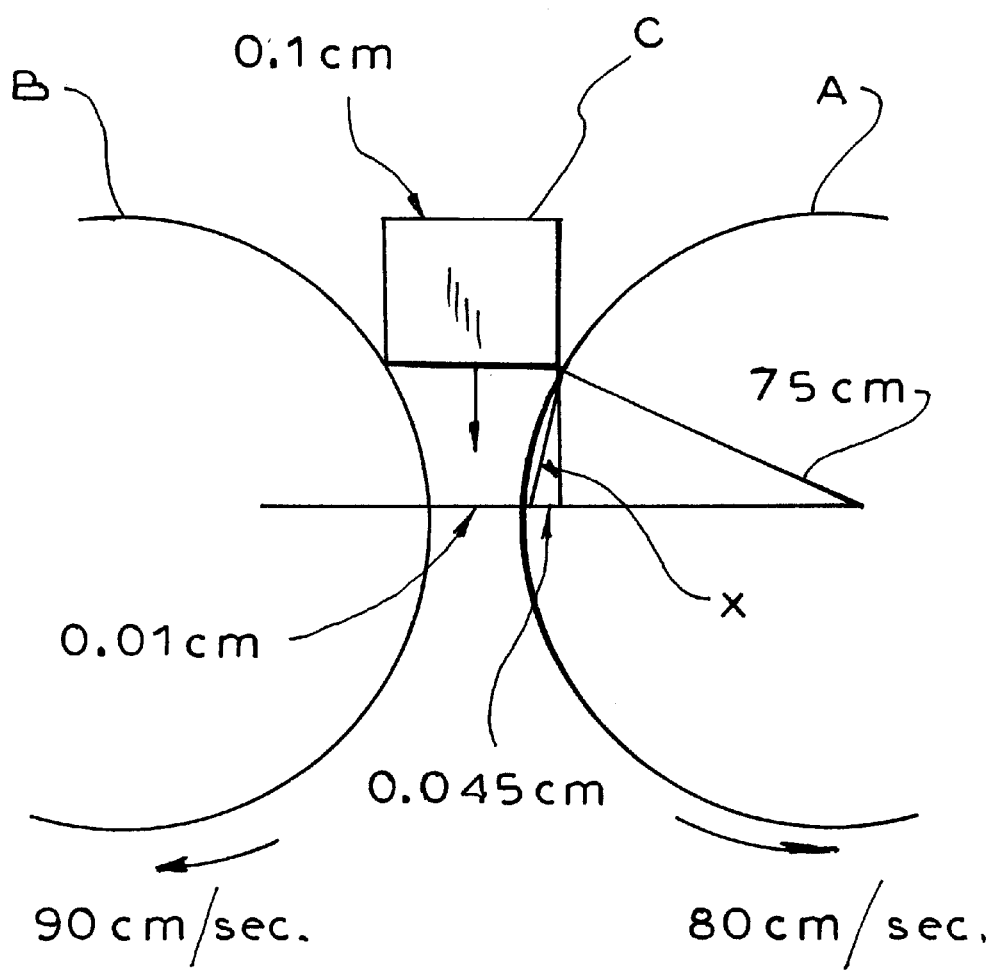
FIG. 2 is a depiction of a particle of rubber being crushed between rollers of roll mills in accordance with a step in the method of the present invention.

As seen from the graph of FIG. 2, "X" represents a particular distance on the graph. We see that an equation can be set up to calculate "X".

$$X/0.045 \text{ cm.} = 75 \text{ cm.}/X.$$

Hence, X=1.8 centimeters. Based on calculation of "X", and if we represent "t" as the time it takes the modified particle to pass by the set of rollers in the roll mill, then, $t=2X/V_1$, which is 3.6/80 or 0.04 seconds. If we further assume that the same modified particle will traverse 20 sets of rollers in roll mills during the course of the de-vulcanization method of the present invention, the average sized modified crushed particle will spend a total time, T.

T=0.04×20, or 0.8 seconds, traveling between the sets of rollers in the roll mills. Now, this is for an average sized particle. For the range of modified crushed particles, the total time, T, will be from 0.5 to 1.5 seconds.

The shear speed of the average sized modified particle traveling in the space between the rollers in the roll mills is given by the following equation: shear speed, $Y=(V_2-V_1)/(k \times m)$, where "k" is the coefficient that takes into consideration the differences between the size of the nip and the dimensions of the particles and where "k" ranges from 1.5 to 2.0. Accordingly, for k=2, we have in our example $Y=(90-80)/(0.1 \times 2)$, or 500, which is $0.5 \times 10^3$. The units are $\text{secs}^{-1}$. Again, for the range of sizes of modified particles, Y=approximately between 0.5 and $0.67 \times 10^3$ $\text{secs}^{-1}$.

Furthermore, based on knowledge about rubber, the modified particle of waste rubber would be compressed in size by a factor of 10 and would travel with a speed ranging from between 1 and $10 \times 10^4$ units, where the units are $\text{secs}^{-1} \times$, as a result there would be generated on the modified particle a shear stress that would be equal to approximately 15 to 20 Megapascals (MN) or equal to 150 to 200 kilograms per centimeter squared as the modified particle travels between the roll mills.

It is assumed that the modified particle would not be sliding between the rollers and this is due to the friction agent that forms part of the modifying composition mixture, as discussed below.

The modified crushed particle of waste rubber is sent into further sets of rollers in roll mills that are identical to the first set of rollers in the first roll mill. The modified crushed particles of waste rubber are poured into an area between two rollers of a second set of rollers in a second roll mill that further crushes the modified crushed particles of waste rubber. The same thing is done with eight further sets of rollers in further roll mills so that at least ten times the particle was sent into a set of rollers of a roll mill.

The number of sets of rollers of roll mills that will be necessary using the method of the present invention may vary from 10 to 20 sets of rollers. If the particles were to go through more than 20 sets of rollers there would be no difference produced with respect to the properties of the end product. Accordingly, after the modified particle is crushed by at least 10 sets of rollers of roll mills, a sample of the modified crushed particles are examined and their consistency is checked. If further crushing by further sets of rollers of roll mills are necessary this is done until a desired consistency is reached, which should occur in a total of approximately 20 or fewer sets of rollers or roll mills.

As can be seen the above method of de-vulcanization is a combination of mechanical and chemical treatment of the waste rubber.

The Composition of the Present Invention

The ingredients of the composition of the present invention have been selected to suppress and minimize subsidiary processes, especially reverse vulcanization processes that occur when the composition and waste rubber is in contact with the mechanical effects of the power roll mills.

The following characteristics describe the composition of the present invention which is a mixture of five ingredients:

1) the mixture is a gray/yellow non-dust forming powder and it has a weak smell. It is almost water insoluble, nonhygroscopic.
2) the mixture does not contain liquid volatile inflammable compounds with unpleasant smells.
3) the ingredients of the mixture are cheap and they are readily available.
4) the ingredients are safe to humans in compliance with the Material Safety Data Sheets ("MSDS") and is safe to the environment.
5) the mixture is stable enough that it can stay in usable form for at least six months The mixture in the rubber does not exceed approximately 4% to 6% by weight of the waste rubber particles during de-vulcanization. 5% is the optimal percentage of composition so as to create the rubber end product having the most desirable properties.

The modifying composition is a mixture of (1) a proton donor that selectively breaks the sulfur bonds and renders the sulfur passive, (2) a metal oxide that build new bonds between macromolecules for later re-vulcanization, (3) an organic acid, having between 16 and 24 carbon atoms per molecule, that reacts with the metal oxide and build new bonds between macromolecules for later re-vulcanization, (4) an inhibitor that prevents re-attachment of sulfur radicals with each other before the proton donor attaches itself to the sulfur and (5) a friction agent that prevents sliding of the waste rubber between the rollers;

The composition for de-vulcanization of waste rubber, comprises a mixture, by weight of five ingredients. The first ingredient is a proton donor such as an acid that breaks the sulfur bonds that exist between sulfur atoms/molecules in vulcanized rubber. It should conform to the above characteristics in that it is non-smelling, cheap, safe, etc. It should also preferably be nontoxic although the condition of the acid or proton donor (and the other four ingredients) not being toxic is not an absolute requirement. For example, it could be of low toxicity and there could be defensive measures taken to avoid any harmful effects from the low toxicity—it may be that doing that is cheaper than using an entirely nontoxic material. It should also be noted that any toxicity of this (or any other ingredient) would decrease after the de-vulcanization method of the present invention due to reaction with heavy macromolecules through sulfur, thereby reducing its mobility.

The mixture contains between approximately 76% by weight and approximately 94% by weight of the proton donor. The preferred percentage is approximately 92%.

Examples of acceptable proton donors are: (a) monobasic organic acid having between 8 and 12 carbon atoms, (b) aromatic oxycarbon acids, (c) mixed phenols (e.g. resorcine, dioxy diphenyl, orcin), (d) phenolformaldehyde resin (novolak or resol), and (e) cyanuric acid. An example of such an acid that is inexpensive, widely available and nontoxic is benzoic acid. When the mixture or modifying composition of the present invention is added to the particles of waste rubber in the roll mill, there is an instant chemical reaction. The active particle is the acid residue and that active particle diffuses throughout the vulcanized rubber network and maintains its activity for 10–100 milliseconds. For example, the active benzoate, which is the acid residue of benzoic acid, is not more than 10 Angstroms long, hence not more than the approximate distance between macromolecules in the vulcanized rubber network When benzoic acid, in the mixture of the composition of the present invention, is added to the waste rubber particle, the COOH group of the benzoic acid attacks the sulfur to sulfur bond in the waste rubber particle. Since benzoic acid easily donates the hydrogen of its COOH group, the benzoic acid minus that hydrogen proton of the COOH group bonds with each sulfur atom and guards the sulfur from reacting and bonding with other sulfur atoms. The sulfur to sulfur bond between the sulfur atoms is thereby broken but the sulfur is not removed from the rubber. Furthermore, the sulfur to sulfur bond has been rendered passive and capable of later re-activation in the presence of heat in excess of 140 degrees Centigrade. During a later re-vulcanization of the waste rubber particles, the waste rubber particles can and do retain (unlike virgin rubber) other necessary components of a rubber product such as tar, carbon black, mineral oil, synthetic rubber etc. and can be molded effectively to the needed form.

Thus the sulfur remains in the macromolecules of waste rubber but is rendered passive. This differs from existing methods wherein the sulfur is rendered active and wherein the end product has to be re-vulcanized quickly since exposure to the sun or other sources of heat will re-vulcanize the active sulfur therein not in the desired shape.

The method of the present invention also maintains the integrity of the waste rubber macromolecules so that it can be re-vulcanized. In accordance with the criteria set forth above, all of which are achieved by the composition of the present invention, no more than 10–15% of the carbon to carbon bonds are broken and the sulfur to sulfur bonds are only selectively broken. Also, it is believed that approximately 20 to 40% of the sulfur to carbon bonds are broken using the method of the present invention. For re-vulcanization of the end product of the method of the present invention it is not necessary to add anything except heat. One does not have to add sulfur, tar, carbon black, mineral oil, etc. because these things have not been removed. Of course, for finished rubber products that have an unusually high sulfur content because they are very hard solid materials, for example ebonite, a small amount of sulfur may well be added during re-vulcanization after the method of the present invention.

After the active particle—the acid minus the hydrogen proton—attaches to the polymer macromolecules, and the sulfur to sulfur bonds have been broken, chemical structures do not appear in place of the broken sulfur to sulfur bonds so later re-vulcanization is not impaired.

Accordingly, the rubber end product of the method of the present invention can be a significant ingredient in the manufacturing of rubber-based products.

The second ingredient of the mixture is between approximately 1% and approximately 5% of a curing agent, specifically a metal oxide, that builds new bonds between macromolecules of the waste rubber for a later re-vulcanization. Examples are zinc oxide, magnesium oxide, calcium oxide and iron oxide. The preferred percentage is approximately 1.5% of the mixture.

The third ingredient in the mixture is between approximately 1% and approximately 5% by weight of another curing agent, namely an organic acid having between 16 and 24 carbon atoms per molecule. The organic acid will reacts with the metal oxide and the organic acid will also build new bonds between macromolecules of the waste rubber for a later re-vulcanization. Examples of the organic acid are stearic acid and palmetic acid. The preferred percentage is approximately 1.5% of the mixture.

The fourth ingredient in the mixture is between approximately 2% and approximately 10% by weight of an inhibitor of vulcanization that prevents re-attachment of sulfur radicals with each other before the proton donor attaches itself to a sulfur radical. The known inhibitors are hydroquinone, polyphenols and phenotiazine.

The fifth and final ingredient of the mixture is between approximately 2% and approximately 10% of a friction agent that prevents sliding of the waste rubber when the waste rubber is poured between the rollers of the roll mills. Sliding would greatly reduce the mechanical compression effect by the power roll mills on the particles of waste rubber. Examples of known friction agents are terpenes. Terpenes may be in the form of an oleoresin, such as rosin, or an essential oil.

The composition of the present invention is selective in that it favors the breaking of sulfur to sulfur bonds over carbon to carbon or carbon to sulfur bonds. The composition does break at least approximately 70% of the sulfur to sulfur ties in the vulcanized rubber network, which is the minimum needed to de-vulcanize the rubber. In contrast, the composition breaks no more than approximately 10 to 15% of the carbon to carbon bonds of the main polymer chains. The carbon to carbon bonds can be said to remain substantially intact and the sulfur to sulfur can be said to have been substantially broken. Consequently, the main Theological, physical/chemical and physical/mechanical characteristics of the rubber remain sufficiently intact for a later re-vulcanization.

The composition and method of the present invention achieves the recycling of used waste rubber into new raw materials of high quality for re-vulcanization. The raw material for rubber vulcanization is made up of de-vulcanized waste rubber including fragments of the composition of the present invention in a different form after having chemically reacted to the waste rubber particles, in which at least approximately 70% of the sulfur to sulfur bonds that existed prior to de-vulcanization of the waste rubber have been broken, in which less than approximately 10% to 15% of the carbon to carbon bonds that existed prior to de-vulcanization of the waste rubber have been broken, which is stable for at least six months and which may be re-vulcanized by heating to a temperature of approximately 140 degrees Centigrade without adding other ingredients.

As a result of the method of the present invention the mixture of the ingredients remain in the rubber after de-vulcanization. This avoids the problem of toxic wastes resulting from a de-vulcanization process.

The method of the present invention requires the combination of the addition of the chemical composition described and the mechanical pressure from being subjected to the power roll mills ten or more times. The present method maintains the integrity of the macromolecules of waste rubber and rendering sulfur atoms passive for a later re-vulcanization, said method being cost effective, environmentally friendly and said method producing high quality de-vulcanized rubber.

DESCRIPTION OF EXAMPLES

The composition of the present invention will be more fully described by reference to the following examples. Parts are by weight unless otherwise specified.

Example I

A modifying composition is made of a mixture of the below ingredients which are solid powders or granules, formulated as follows:

| Ingredient | Percent |
| --- | --- |
| 1. Benzoic acid | approximately 92% |
| 2. Zinc oxide | approximately 1.5% |
| 3. Stearic acid | approximately 1.5% |
| 4. Hydroquinone | approximately 2% |
| 5. Rosin | approximately 3% |

Example II

A modifying composition is made of a mixture of the below ingredients which are solid powders or granules, formulated as follows:

| Ingredient | Percent |
| --- | --- |
| 1. Phenol-formaldehyde resin (novolak) | approximately 83.0% |
| 2. Magnesium oxide | approximately 5.0% |
| 3. Palmetic acid | approximately 5.0% |
| 4. Polyphenols | approximately 3.0% |
| 5. A mixture of Terpenes | approximately 4% |

Example III

A modifying composition is made of a mixture of the below ingredients which are solid powders or granules, formulated as follows:

| Ingredient | Percent |
| --- | --- |
| 1. Cyanuric acid | approximately 89.0% |
| 2. Calcium oxide | approximately 2.0% |
| 3. Palmetic acid | approximately 2.0% |
| 4. Phenotiazine | approximately 4.0% |
| 5. Rosin | approximately 3% |

Example IV

A modifying composition is made of a mixture of the below ingredients which are solid powders or granules, formulated as follows:

| Ingredient | Percent |
| --- | --- |
| 1. Aromatic oxycarbon acids | approximately 76.0% |
| 2. Iron oxide | approximately 5.0% |
| 3. Stearic acid | approximately 5.0% |
| 4. Polyphenols | approximately 10.0% |
| 5. Terpenes | approximately 4% |

Example V

A modifying composition is made of a mixture of the below ingredients which are solid powders or granules, formulated as follows:

| Ingredient | Percent |
| --- | --- |
| 1. Phenol formaldehyde resin (resol) | approximately 94% |
| 2. Zinc oxide | approximately 1.0% |
| 3. Stearic acid | approximately 1.0% |
| 4. Hydroquinone | approximately 2% |
| 5. Rosin | approximately 2% |

Example VI

A modifying composition is made of a mixture of the below ingredients which are solid powders or granules, formulated as follows:

| Ingredient | Percent |
| --- | --- |
| 1. Mixed Phenols (resorcine, dioxydiphenyle, orcin) | approximately 85% |
| 2. Zinc oxide | approximately 2.0% |
| 3. Palmetic acid | approximately 2.0% |
| 4. Phenotiazine | approximately 8% |
| 5. Rosin | approximately 3% |

In examples I through VI the mixture is created of the five ingredients listed above and this mixture is added to the particles of waste rubber as they are being poured into an area between two roll mills for compression and shearing deformation. The result of the de-vulcanized end product is a high quality rubber product that does not need anything added during re-vulcanization. However, as a practical matter a small amount (much less than needed when starting with virgin rubber) of sulfur, mineral oil and virgin rubber is usually added for enhanced properties.

The method and composition of the present invention produce a rubber end product that can be stored longer and that does not require additives in the re-vulcanization process. This greatly increases the value of the millions of used tires lying in the rubber dumps since these used tires are the starting material for the de-vulcanization process. Consequently, the method and composition of the present invention lead to a reduction in the number of used tires remaining in the dumps by making their use more attractive. For this reason, the method and composition of the present invention materially enhances the environment. A second reason that the method and composition of the present invention materially enhances the environment is that, unlike prior art methods and compositions, the use of the present method and composition does not itself damage the environment by creating toxic byproducts in the air or water or by making use of toxic materials.

Tables 1 through 4 have been included to demonstrate that the method and composition of the present invention is effective for the purposes described and that the end product of the method achieves excellent characteristics useful for re-vulcanization.

TABLE 1

| No. | Proton Donor | Metal Oxide | Organic Acid C(16–24) | Inhibitor | Friction Agent |
| --- | --- | --- | --- | --- | --- |
| D1 | monobasic acid 89.0 | zinc oxide 2.0 | stearic acid 2.0 | hydroquinone 4.0 | rosin 3.0 |

TABLE 1-continued

| No. | Proton Donor | Metal Oxide | Organic Acid C(16–24) | Inhibitor | Friction Agent |
|---|---|---|---|---|---|
| D2 | aromatic oxycarbon acid 85.0 | magnesium oxide 3.0 | palmetic acid 3.0 | polyphenols 6.0 | rosin 3.0 |
| D3 | mixed phenols (resorcine, dioxydiphenyl, orcin) 85.0 | zinc oxide 2.0 | stearic acid 2.0 | phenotiazine 8.0 | terpene 3.0 |
| D4 | phenol-formaldehyde resin (novolak) 88.0 | calcium oxide 3.0 | stearic acid 3.0 | hydroquinone 3.5 | rosin 2.5 |
| D5 | phenol-formaldehyde resin (resol) 83.0 | calcium oxide 5.0 | stearic acid 5.0 | hydroquinone 3.0 | rosin 4.0 |
| D6 | cyanuric acid 88.5 | iron oxide 3.0 | palmetic acid 3.0 | phenotiazine 2.5 | rosin 3.0 |
| D7 | monobasic carbon acids, C(8–12) 78.0 | zinc oxide 5.0 | stearic acid 5.0 | hydroquinone 8.0 | rosin 4.0 |
| D8 | aromatic oxycarbon acids 76.0 | magnesium oxide 5.0 | palmetic acid 5.0 | polyphenols 10.0 | rosin 4.0 |
| D9 | mixed phenols (resorcine, dioxyphenyl, orcin) 77.0 | zinc oxide 4.5 | stearic acid 4.5 | phenotiazine 10.0 | terpene 10.0 |
| D10 | phenol-formaldehyde resin (novolak) 81.0 | calcium oxide 4.0 | stearic acid 4.0 | hydroquinone 7.0 | rosin 4.0 |
| D11 | phenol-formaldehyde resin (resol) 80.5 | calcium oxide 5.0 | stearic acid 5.0 | hydroquinone 6.0 | rosin 3.5 |
| D12 | cyanuric acid 81.0 | iron oxide 4.5 | palmetic acid 4.5 | phenotiazine 7.0 | rosin 3.0 |
| D13 | monobasic carbon acids, C(8–12) 94.0 | zinc oxide 1.0 | stearic acid 1.0 | hydroquinone 2.0 | rosin 2.0 |
| D14 | aromatic oxycarbon acids 91.5 | magnesium oxide 1.5 | palmetic acid 1.5 | polyphenols 3.0 | rosin 2.5 |
| D15 | mixed phenols (resorcine, dioxydiphenyle, orcin) 91.5 | zinc oxide 1.5 | stearic acid 1.5 | phenotiazine 3.0 | terpene 2.5 |
| D16 | phenol-formaldehyde resin (novolak) 94.0 | calcium oxide 1.0 | stearic acid 1.0 | hydroquinone 2.0 | rosin 2.0 |
| D17 | phenol-formaldehyde resin (resol) 92.5 | calcium oxide 1.5 | stearic acid 1.5 | hydroquinone 2.5 | rosin 2.0 |
| D18 | cyanuirc acid 94.0 | iron oxide 1.0 | palmetic acid 1.0 | phenotiazine 2.0 | rosin 2.0 |

TABLE 2

| No. Regenerate Sample | No. Mixture from Table 1 | Composition by weight as % of weight of rubber waste particle | Roll Mill Temperature, degree | Roll Mill Friction | Process Time, minute |
|---|---|---|---|---|---|
| R1 | D1 | 1.0 | 50 | 1.2 | 15 |
| R2 | D1 | 3.0 | 55 | 1.2 | 12 |
| R3 | D1 | 4.5 | 50 | 1.2 | 10 |
| R4 | D2 | 1.5 | 45 | 1.3 | 15 |
| R5 | D2 | 3.5 | 40 | 1.3 | 13 |
| R6 | D2 | 5.0 | 45 | 1.3 | 10 |
| R7 | D3 | 0.5 | 25 | 1.15 | 15 |
| R8 | D3 | 2.5 | 30 | 1.15 | 11 |
| R9 | D3 | 5.0 | 30 | 1.15 | 10 |
| R10 | D4 | 1.0 | 43 | 1.2 | 14 |
| R11 | D4 | 3.0 | 35 | 1.2 | 10 |
| R12 | D4 | 4.5 | 35 | 1.2 | 10 |
| R13 | D5 | 1.5 | 40 | 1.3 | 147 |
| R14 | D5 | 2.5 | 40 | 1.3 | 13 |
| R15 | D5 | 3.0 | 45 | 1.3 | 11 |
| R16 | D6 | 1.5 | 60 | 1.15 | 14 |
| R17 | D6 | 3.0 | 55 | 1.15 | 12 |
| R18 | D6 | 4.0 | 60 | 1.15 | 10 |
| R19 | D7 | 2.0 | 45 | 1.2 | 15 |
| R20 | D7 | 4.0 | 40 | 1.2 | 13 |
| R21 | D7 | 5.0 | 45 | 1.2 | 12 |
| R22 | D8 | 0.5 | 40 | 1.15 | 14 |
| R23 | D8 | 3.0 | 30 | 1.15 | 13 |
| R24 | D8 | 5.0 | 35 | 1.15 | 10 |
| R25 | D9 | 1.5 | 35 | 1.2 | 15 |
| R26 | D9 | 2.0 | 35 | 1.2 | 12 |
| R27 | D9 | 3.0 | 50 | 1.2 | 10 |
| R28 | D10 | 2.0 | 45 | 1.15 | 15 |
| R29 | D10 | 4.0 | 50 | 1.15 | 13 |
| R30 | D10 | 5.0 | 45 | 1.15 | 11 |
| R31 | D11 | 1.0 | 50 | 1.15 | 15 |
| R32 | D11 | 3.0 | 60 | 1.15 | 12 |
| R33 | D11 | 4.5 | 50 | 1.15 | 10 |
| R34 | D12 | 1.5 | 55 | 1.15 | 15 |
| R35 | D12 | 3.0 | 40 | 1.15 | 13 |
| R36 | D12 | 5.0 | 40 | 1.15 | 11 |
| R37 | D13 | 0.5 | 40 | 1.2 | 14 |
| R38 | D13 | 3.0 | 45 | 1.2 | 13 |
| R39 | D13 | 4.5 | 45 | 1.2 | 10 |
| R40 | D14 | 2.0 | 40 | 1.15 | 15 |
| R41 | D14 | 3.0 | 40 | 1.2 | 13 |
| R42 | D14 | 4.0 | 40 | 1.2 | 10 |
| R43 | D15 | 1.5 | 45 | 1.15 | 14 |
| R44 | D15 | 2.5 | 40 | 1.15 | 13 |
| R45 | D15 | 3.5 | 40 | 1.15 | 10 |
| R46 | D16 | 1.5 | 40 | 1.2 | 15 |
| R47 | D16 | 3.0 | 55 | 1.2 | 12 |
| R48 | D16 | 4.5 | 50 | 1.2 | 10 |
| R49 | D17 | 0.5 | 50 | 1.15 | 14 |
| R50 | D17 | 2.0 | 50 | 1.15 | 12 |
| R51 | D17 | 5.0 | 45 | 1.15 | 10 |
| R52 | D18 | 2.0 | 45 | 1.15 | 15 |
| R53 | D18 | 3.0 | 45 | 1.2 | 13 |
| R54 | D18 | 4.0 | 50 | 1.15 | 11 |

TABLE 3

| No. Mixtures | No. regenerate Samples from Table 2 | Sulfur (weight part to 100 weight part of Regenerate) | Mineral Oil (w.p. to 100 w.p. of Regenerate) | Virgin Rubber (w.p. to 100 w.p. of Regenerate) |
|---|---|---|---|---|
| M1 | R1 | 0.5 | 2.0 | 8 |
| M2 | R1 | 1.5 | 3.0 | 10 |
| M3 | R1 | 3.0 | 5.0 | 12 |
| M4 | R2 | 0.5 | 2.0 | 8 |
| M5 | R2 | 1.5 | 3.0 | 10 |
| M6 | R2 | 3.0 | 5.0 | 12 |
| M7 | R3 | 0.5 | 2.0 | 8 |
| M8 | R3 | 1.5 | 3.0 | 10 |

TABLE 3-continued

| No. Mixtures | No. regenerate Samples from Table 2 | Sulfur (weight part to 100 weight part of Regenerate) | Mineral Oil (w.p. to 100 w.p. of Regenerate) | Virgin Rubber (w.p. to 100 w.p. of Regenerate) |
|---|---|---|---|---|
| M9 | R3 | 3.0 | 5.0 | 12 |
| M10 | R4 | 0.5 | 2.0 | 8 |
| M11 | R4 | 1.5 | 3.0 | 10 |
| M12 | R4 | 3.0 | 5.0 | 12 |
| M13 | R5 | 0.5 | 2.0 | 8 |
| M14 | R5 | 1.5 | 3.0 | 10 |
| M15 | R5 | 3.0 | 5.0 | 12 |
| M16 | R6 | 0.5 | 2.0 | 8 |
| M17 | R6 | 1.5 | 3.0 | 10 |
| M18 | R6 | 3.0 | 5.0 | 12 |
| M19 | R7 | 1.0 | 33.0 | 10 |
| M20 | R8 | 1.0 | 3.3 | 10 |
| M21 | R9 | 1.5 | 3.0 | 10 |
| M22 | R10 | 0.5 | 4.0 | 10 |
| M23 | R11 | 1.5 | 4.0 | 10 |
| M24 | R12 | 1.5 | 4.0 | 10 |
| M25 | R13 | 1.0 | 3.0 | 10 |
| M26 | R14 | 1.5 | 3.0 | 10 |
| M27 | R15 | 0.5 | 3.0 | 10 |
| M28 | R16 | 1.5 | 3.0 | 10 |
| M29 | R17 | 1.0 | 4.0 | 10 |
| M30 | R18 | 1.0 | 4.0 | 10 |
| M31 | R19 | 1.0 | 3.0 | 12 |
| M32 | R20 | 1.5 | 3.0 | 12 |
| M33 | R21 | 0.5 | 3.0 | 12 |
| M34 | R22 | 1.5 | 2.0 | 12 |
| M35 | R23 | 1.5 | 2.0 | 12 |
| M36 | R24 | 1.5 | 3.0 | 12 |
| M37 | R25 | 1.0 | 3.0 | 12 |
| M38 | R26 | 1.0 | 3.0 | 12 |
| M39 | R27 | 0.5 | 3.0 | 12 |
| M40 | R28 | 0.5 | 4.0 | 12 |
| M41 | R29 | 1.5 | 4.0 | 12 |
| M42 | R30 | 1.0 | 2.0 | 12 |
| M43 | R31 | 1.0 | 2.0 | 12 |
| M44 | R32 | 1.0 | 2.0 | 12 |
| M45 | R33 | 1.5 | 3.0 | 12 |
| M46 | R34 | 1.5 | 4.0 | 12 |
| M47 | R35 | 1.5 | 3.0 | 12 |
| M48 | R36 | 1.0 | 3.0 | 12 |
| M49 | R37 | 1.0 | 3.0 | 10 |
| M50 | R38 | 1.0 | 3.0 | 10 |
| M51 | R39 | 0.5 | 4.0 | 10 |
| M52 | R40 | 1.0 | 4.0 | 10 |
| M53 | R41 | 1.5 | 4.0 | 10 |
| M54 | R42 | 1.0 | 4.0 | 10 |
| M55 | R43 | 1.0 | 4.0 | 10 |
| M56 | R44 | 1.0 | 3.0 | 10 |
| M57 | R45 | 1.5 | 3.0 | 10 |
| M58 | R46 | 1.5 | 3.0 | 10 |
| M59 | R47 | 1.0 | 3.0 | 10 |
| M60 | R48 | 1.0 | 3.0 | 10 |
| M61 | R49 | 1.5 | 3.0 | 10 |
| M62 | R50 | 1.5 | 3.0 | 10 |
| M63 | R51 | 1.0 | 3.0 | 10 |
| M64 | R52 | 1.0 | 3.0 | 10 |
| M65 | R53 | 1.0 | 3.0 | 10 |
| M66 | R54 | 1.5 | 4.0 | 10 |

TABLE 4

| No. Mixture from Table 3 | Mooney Viscosity at 70 degrees C. | Module 100%, MP | Tensile Strength, MP | Elongation, % | Hardness, Shore |
|---|---|---|---|---|---|
| Initial Vulcanizate | 45 | 2.7 | 21.5 | 520 | 58 |
| M1 | 75 | 2.6 | 15.2 | 380 | 56 |
| M2 | 65 | 2.4 | 13.9 | 350 | 61 |
| M3 | 80 | 1.9 | 11.7 | 410 | 59 |
| M4 | 95 | 3.0 | 14.6 | 330 | 62 |
| M5 | 60 | 2.2 | 16.1 | 400 | 58 |
| M6 | 90 | 2.6 | 15.6 | 370 | 60 |
| M7 | 55 | 2.9 | 15.7 | 290 | 57 |
| M8 | 70 | 3.0 | 13.0 | 300 | 66 |
| M9 | 100 | 2.4 | 17.0 | 360 | 63 |
| M10 | 85 | 2.1 | 14.8 | 280 | 59 |
| M11 | 90 | 1.8 | 15.2 | 420 | 62 |
| M12 | 65 | 2.2 | 15.0 | 350 | 57 |
| M13 | 100 | 2.5 | 17.0 | 410 | 58 |
| M14 | 55 | 2.4 | 16.2 | 300 | 60 |
| M15 | 75 | 2.4 | 14.1 | 190 | 64 |
| M16 | 95 | 2.9 | 11.0 | 340 | 59 |
| M17 | 80 | 3.1 | 10.2 | 330 | 61 |
| M18 | 60 | 2.7 | 16.2 | 400 | 56 |
| M19 | 95 | 2.8 | 16.4 | 370 | 57 |
| M20 | 80 | 2.4 | 15.9 | 220 | 61 |
| M21 | 85 | 2.2 | 13.1 | 300 | 67 |
| M22 | 65 | 2.6 | 10.0 | 350 | 56 |
| M23 | 75 | 2.9 | 10.2 | 320 | 66 |
| M24 | 80 | 2.1 | 17.0 | 380 | 60 |
| M25 | 100 | 1.4 | 15.9 | 390 | 64 |
| M26 | 70 | 2.6 | 14.7 | 350 | 58 |
| M27 | 75 | 3.0 | 13.0 | 230 | 68 |
| M28 | 80 | 2.2 | 12.7 | 290 | 59 |
| M29 | 90 | 2.6 | 9.9 | 300 | 70 |
| M30 | 55 | 2.9 | 10.9 | 390 | 62 |
| M31 | 75 | 2.7 | 17.1 | 340 | 66 |
| M32 | 65 | 2.8 | 11.9 | 400 | 57 |
| M33 | 90 | 2.5 | 18.0 | 280 | 63 |
| M34 | 60 | 2.4 | 9.5 | 240 | 60 |
| M35 | 85 | 2.5 | 16.0 | 350 | 69 |
| M36 | 85 | 2.6 | 9.7 | 440 | 56 |
| M37 | 100 | 2.1 | 14.8 | 330 | 68 |
| M38 | 70 | 2.9 | 10.8 | 360 | 59 |
| M39 | 60 | 2.3 | 12.6 | 410 | 58 |
| M40 | 95 | 2.7 | 17.3 | 250 | 67 |
| M41 | 100 | 2.8 | 13.1 | 280 | 52 |
| M42 | 80 | 3.1 | 15.8 | 390 | 71 |
| M43 | 90 | 2.9 | 11.7 | 300 | 61 |
| M44 | 65 | 2.4 | 14.9 | 370 | 57 |
| M45 | 75 | 2.6 | 12.5 | 390 | 57 |
| M46 | 55 | 2.1 | 17.4 | 330 | 60 |
| M47 | 60 | 1.8 | 11.5 | 260 | 64 |
| M48 | 85 | 2.9 | 10.7 | 370 | 58 |
| M49 | 95 | 2.0 | 15.7 | 290 | 68 |
| M50 | 65 | 2.4 | 14.0 | 320 | 61 |
| M51 | 90 | 2.7 | 9.3 | 270 | 56 |
| M52 | 55 | 2.1 | 17.5 | 370 | 66 |
| M53 | 70 | 2.6 | 12.0 | 350 | 59 |
| M54 | 90 | 2.0 | 136.2 | 440 | 70 |
| M55 | 70 | 3.1 | 12.1 | 310 | 60 |
| M56 | 85 | 2.1 | 13.0 | 400 | 62 |
| M57 | 80 | 2.6 | 15.5 | 290 | 56 |
| M58 | 100 | 2.5 | 12.4 | 330 | 63 |
| M59 | 65 | 2.3 | 15.0 | 270 | 58 |
| M60 | 60 | 2.1 | 17.6 | 240 | 62 |
| M61 | 90 | 2.3 | 11.3 | 300 | 59 |
| M62 | 95 | 1.9 | 9.1 | 180 | 61 |
| M63 | 60 | 2.0 | 10.6 | 370 | 57 |
| M64 | 85 | 2.7 | 13.3 | 250 | 63 |
| M65 | 100 | 2.6 | 12.3 | 280 | 54 |
| M66 | 75 | 2.4 | 15.0 | 410 | 59 |

Table 1 represents 18 different tested combinations, D1 through D18, of the various ingredient candidates and various percentages within the range of acceptable percentages for the five ingredients in the composition mixture of the present invention. Table 2 represents taking those 18 combinations and varying roll mill temperature, friction and the weight part of the composition resulting in 54 different de-vulcanization samples R1 through R54. Table 3 represents taking the 54 de-vulcanized samples and varying the addition of sulfur, mineral oil and virgin rubber during re-vulcanization. As the below Table 3 demonstrates, a combined total of only approximately 10 to 20% of these three ingredients have been added during re-vulcanization and the properties (e.g. Mooney viscosity, module 100% which is the strength at 100% elongation, tensile strength, elongation, hardness) of the re-vulcanized rubber were tested. The results of these tested properties are set forth in Table 4.

It is to be understood that while the method and composition of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof It is not desired to limit the invention to the exact construction and operation shown and described. The spirit and scope of this invention are limited only by the spirit and scope of the following claims.

What is claimed is:

1. A method of de-vulcanizing waste rubber made of a network of polymer macromolecules from which metal has already been removed wherein in the waste rubber there are sulfur to sulfur bonds between sulfur atoms, sulfur to carbon bonds between sulfur and carbon atoms and carbon to carbon bonds between carbon atoms, comprising the steps of:
   (A) turning the waste rubber, using any known means, into particles of waste rubber, said known means typically being shredding and crushing the waste rubber to make particles of waste rubber;
   (B) simultaneously adding a modifying composition to the particles of waste rubber while the particles of waste rubber are being poured into an area between rollers of a first roll mill that crushes the particles, thereby creating modified crushed particles, said modifying composition being a mixture of (1) a proton donor that breaks the sulfur to sulfur bonds and renders the sulfur passive, (2) a metal oxide that build new bonds between macromolecules for later re-vulcanization, (3) an organic acid that reacts with the metal oxide and build new bonds between macromolecules for later re-vulcanization, (4) a vulcanization inhibitor that prevents re-attachment of sulfur radicals with each other before the proton donor attaches itself to the sulfur and (5) a friction agent that prevents sliding of the waste rubber between the rollers of the first roll mill and between rollers of a second roll mill and of further roll mills;
   (C) pouring the modified crushed particles of waste rubber into an area between rollers of the second roll mill that crushes the modified crushed particles of waste rubber;
   (D) repeating Step (C) by pouring the modified crushed particles of waste rubber into an area between rollers of eight further roll mills;
   (E) checking a consistency of the modified crushed particles of waste rubber resulting from steps (A) through (D) and then repeating step (C) for rollers of additional roll mills as necessary to reach a desired consistency, the method maintaining an integrity of a macromolecule of waste rubber and rendering sulfur atoms passive for a later re-vulcanization, said method being cost effective, environmentally friendly and said method producing high quality de-vulcanized rubber.

2. The method of claim 1, wherein the polymer macromolecules remain substantially intact.

3. The method of claim 1, wherein at least approximately 70% of the sulfur to sulfur bonds are broken and wherein no more than approximately 10 to 15% of the carbon to carbon bonds are broken.

4. The method of claim 1, wherein the carbon to carbon bonds remain substantially intact and wherein the sulfur to sulfur bonds are substantially broken.

5. The method of claim 1, wherein the modifying composition generates an active particle with dimensions not more than approximately 10 angstroms.

6. The method of claim 1, wherein the modifying composition generates an active particle that maintains its activity for between approximately 10 and approximately 100 milliseconds.

7. The method of claim 1, wherein after an active particle generated by the modifying composition attaches to polymer macromolecules and the sulfur to sulfur bonds have been broken, the modifying composition prevents chemical structures from appearing in place of the broken sulfur to sulfur bonds.

8. The method of claim 1, wherein a weight of the modifying composition is between approximately 3% and approximately 6% of a weight of the particles of waste rubber.

9. The method of claim 1, wherein a weight of the modifying composition is approximately 5% of a weight of the particles of waste rubber.

10. The method of claim 1, wherein the modifying composition remains in the modified crushed particles of waste rubber after the method is completed.

11. The method of claim 1, wherein at least approximately 70% of the sulfur to sulfur bonds are broken and wherein no more than approximately 10 to 15% of the carbon to carbon bonds are broken, wherein a weight of the modifying composition represents between approximately 3% and approximately 6% of a weight of the particles of waste rubber and wherein the modifying composition remains in the modified crushed particles of waste rubber after the method is completed.

12. The method of claim 1, wherein the modifying composition generates an active particle with dimensions not more than approximately 10 angstroms, wherein the modifying composition generates an active particle that maintains its activity for between approximately 10 and approximately 100 milliseconds, wherein after an active particle generated by the modifying composition attaches to polymer macromolecules and the sulfur to sulfur bonds have been broken, the modifying composition prevents chemical structures from appearing in place of the broken sulfur to sulfur bonds, wherein at least approximately 70% of the sulfur to sulfur bonds are broken, wherein no more than approximately 10 to 15% of the carbon to carbon bonds are broken, wherein a weight of the modifying composition is between approximately 3% and approximately 6% of a weight of the particles of waste rubber and wherein the modifying composition remains in the modified crushed particles of waste rubber after the method is completed.

13. A method of de-vulcanizing waste rubber made of a network of polymer macromolecules wherein there are sulfur to sulfur bonds between sulfur atoms, sulfur to carbon bonds between sulfur atoms and carbon atoms and carbon to carbon bonds between carbon atoms, comprising the steps of:
   (A) turning the waste rubber, using any known means, into particles of waste rubber, said known means typically being shredding and crushing the waste rubber to make particles of waste rubber;

(B) removing any metal by magnetically separating said metal from the particles of waste rubber;

(C) simultaneously adding a modifying composition to the particles of waste rubber while the particles of waste rubber are being poured into an area between rollers of a first roll mill that crushes the particles, thereby creating modified crushed particles, said modifying composition being a mixture of (1) a proton donor that breaks the sulfur to sulfur bonds and renders the sulfur atoms passive, (2) a metal oxide that build new bonds between macromolecules for later re-vulcanization, (3) an organic acid that reacts with the metal oxide and build new bonds between macromolecules for later revulcanization, (4) a vulcanization inhibitor that prevents re-attachment of sulfur radicals with each other before the proton donor attaches itself to the sulfur and (5) a friction agent that prevents sliding of the waste rubber between the rollers of the first roll mill and between rollers of a second roll mill and of further roll mills;

(D) pouring the modified crushed particles of waste rubber into an area between rollers of the second roll mill that crushes the modified crushed particles of waste rubber;

(E) repeating Step (D) by pouring the modified crushed particles of waste rubber into an area between rollers of eight further roll mills;

(F) checking a consistency of the modified crushed particles of waste rubber resulting from steps (A) through (E) and then repeating step (D) for rollers of additional roll mills as necessary to reach a desired consistency, the method maintaining an integrity of a macromolecule of waste rubber and rendering sulfur atoms passive for a later revulcanization, said method being cost effective, environmentally friendly and said method producing high quality de-vulcanized rubber.

14. The method of claim 13, wherein the polymer macromolecules remain substantially intact.

15. The method of claim 13, wherein at least approximately 70% of the sulfur to sulfur bonds are broken and wherein no more than approximately 10 to 15% of the carbon to carbon bonds are broken.

16. The method of claim 13, wherein the carbon to carbon bonds remain substantially intact and wherein the sulfur to sulfur bonds are substantially broken.

17. The method of claim 13, wherein the modifying composition generates an active particle with dimensions not more than approximately 10 angstroms.

18. The method of claim 13, wherein the modifying composition generates an active particle that maintains its activity for between approximately 10 and approximately 100 milliseconds.

19. The method of claim 13, wherein after an active particle generated by the modifying composition attaches to polymer macromolecules and the sulfur to sulfur bonds have been broken, the modifying composition prevents chemical structures from appearing in place of the broken sulfur to sulfur bonds.

20. The method of claim 13, wherein a weight of the modifying composition is between approximately 3% and approximately 6% of a weight of the particles of waste rubber.

21. The method of claim 13, wherein a weight of the modifying composition is approximately 5% of a weight of the particles of waste rubber.

22. The method of claim 13, wherein the rubber the modifying composition remains in the modified crushed particles of waste rubber after the method is completed.

23. The method of claim 13, wherein at least approximately 70% of the sulfur to sulfur bonds are broken and wherein no more than approximately 10 to 15% of the carbon to carbon bonds are broken, wherein a weight of the modifying composition represents between approximately 3% and approximately 6% of a weight of the particles of waste rubber and wherein the modifying composition remains in the modified crushed particles of waste rubber after the method is completed.

24. The method of claim 13, wherein the modifying composition generates an active particle with dimensions not more than approximately 10 angstroms, wherein the modifying composition generates an active particle that maintains its activity for between approximately 10 and approximately 100 milliseconds, wherein after an active particle generated by the modifying composition attaches to polymer macromolecules and the sulfur to sulfur bonds have been broken, the modifying composition prevents chemical structures from appearing in place of the broken sulfur to sulfur bonds, wherein at least approximately 70% of the sulfur to sulfur bonds are broken, wherein no more than approximately 10 to 15% of the carbon to carbon bonds are broken, wherein a weight of the modifying composition is between approximately 3% and approximately 6% of a weight of the particles of waste rubber and wherein the modifying composition remains in the modified crushed particles of waste rubber after the method is completed.

25. A method of de-vulcanizing particles of waste rubber made of a network of polymer macromolecules from which metal has already been removed, wherein in the particles of waste rubber there are sulfur to sulfur bonds between sulfur atoms, sulfur to carbon bonds between sulfur and carbon atoms and carbon to carbon bonds between carbon atoms, comprising the steps of:

(A) simultaneously adding a modifying composition to the particles of waste rubber while the particles of waste rubber are being poured into an area between rollers of a first roll mill that crushes the particles, thereby creating modified crushed particles, said modifying composition being a mixture of (1) a proton donor that breaks the sulfur to sulfur bonds and renders the sulfur passive, (2) a metal oxide that build new bonds between macromolecules for later re-vulcanization, (3) an organic acid that reacts with the metal oxide and build new bonds between macromolecules for later re-vulcanization, (4) a vulcanization inhibitor that prevents re-attachment of sulfur radicals with each other before the proton donor attaches itself to the sulfur and (5) a friction agent that prevents sliding of the waste rubber between the rollers of the first roll mill and between rollers of a second roll mill and of further roll mills;

(B) pouring the modified crushed particles of waste rubber into an area between rollers of the second roll mill that crushes the modified crushed particles of waste rubber;

(C) repeating Step (B) by pouring the modified crushed particles of waste rubber into an area between rollers of eight further roll mills;

(D) checking a consistency of the modified crushed particles of waste rubber resulting from steps (A) through (C) and then repeating step (B) for rollers of additional roll mills as necessary to reach a desired consistency, the method maintaining an integrity of a macromolecule of waste rubber and rendering sulfur atoms passive for a later re-vulcanization, said method being cost effective, environmentally friendly and said method producing high quality de-vulcanized rubber.

26. The method of claim 25, wherein the polymer macromolecules remain substantially intact.

27. The method of claim 25, wherein at least approximately 70% of the sulfur to sulfur bonds are broken and wherein no more than approximately 10 to 15% of the carbon to carbon bonds are broken.

28. The method of claim 25, wherein the carbon to carbon bonds remain substantially intact and wherein the sulfur to sulfur bonds are substantially broken.

29. The method of claim 25, wherein the modifying composition generates an active particle with dimensions not more than approximately 10 angstroms.

30. The method of claim 25, wherein the modifying composition generates an active particle that maintains its activity for between approximately 10 and approximately 100 milliseconds.

31. The method of claim 25, wherein after an active particle generated by the modifying composition attaches to polymer macromolecules and the sulfur to sulfur bonds have been broken, the modifying composition prevents chemical structures from appearing in place of the broken sulfur to sulfur bonds.

32. The method of claim 25, wherein a weight of the modifying composition is between approximately 3% and approximately 6% of a weight of the particles of waste rubber.

33. The method of claim 25, wherein a weight of the modifying composition is approximately 5% of a weight of the particles of waste rubber.

34. The method of claim 25, wherein the modifying composition remains in the modified crushed particles of waste rubber after the method is completed.

35. The method of claim 25, wherein at least approximately 70% of the sulfur to sulfur bonds are broken and wherein no more than approximately 10 to 15% of the carbon to carbon bonds are broken, wherein a weight of the modifying composition represents between approximately 3% and approximately 6% of a weight of the particles of waste rubber and wherein the modifying composition remains in the modified crushed particles of waste rubber after the method is completed.

36. The method of claim 25, wherein the modifying composition generates an active particle with dimensions not more than approximately 10 angstroms, wherein the modifying composition generates an active particle that maintains its activity for between approximately 10 and approximately 100 milliseconds, wherein after an active particle generated by the modifying composition attaches to polymer macromolecules and the sulfur to sulfur bonds have been broken, the modifying composition prevents chemical structures from appearing in place of the broken sulfur to sulfur bonds, wherein at least approximately 70% of the sulfur to sulfur bonds are broken, wherein no more than approximately 10 to 15% of the carbon to carbon bonds are broken, wherein a weight of the modifying composition is between approximately 3% and approximately 6% of a weight of the particles of waste rubber and wherein the modifying composition remains in the modified crushed particles of waste rubber after the method is completed.

37. A method of de-vulcanizing particles of waste rubber made of a network of polymer macromolecules wherein there are sulfur to sulfur bonds between sulfur atoms, sulfur to carbon bonds between sulfur atoms and carbon atoms and carbon to carbon bonds between carbon atoms, comprising the steps of:

(A) removing any metal by magnetically separating said metal from the particles of waste rubber;

(B) simultaneously adding a modifying composition to the particles of waste rubber while the particles of waste rubber are being poured into an area between rollers of a first roll mill that crushes the particles, thereby creating modified crushed particles, said modifying composition being a mixture of (1) a proton donor that breaks the sulfur to sulfur bonds and renders the sulfur atoms passive, (2) a metal oxide that build new bonds between macromolecules for later re-vulcanization, (3) an organic acid that reacts with the metal oxide and build new bonds between macromolecules for later revulcanization, (4) a vulcanization inhibitor that prevents re-attachment of sulfur radicals with each other before the proton donor attaches itself to the sulfur and (5) a friction agent that prevents sliding of the waste rubber between the rollers of the first roll mill and between rollers of a second roll mill and of further roll mills;

(C) pouring the modified crushed particles of waste rubber into an area between rollers of the second roll mill that crushes the modified crushed particles of waste rubber;

(D) repeating Step (C) by pouring the modified crushed particles of waste rubber into an area between rollers of eight further roll mills;

(E) checking a consistency of the modified crushed particles of waste rubber resulting from steps (A) through (D) and then repeating step (C) for rollers of additional roll mills as necessary to reach a desired consistency, the method maintaining an integrity of a macromolecule of waste rubber and rendering sulfur atoms passive for a later revulcanization, said method being cost effective, environmentally friendly and said method producing high quality de-vulcanized rubber.

38. The method of claim 37, wherein the polymer macromolecules remain substantially intact.

39. The method of claim 37, wherein at least approximately 70% of the sulfur to sulfur bonds are broken and wherein no more than approximately 10 to 15% of the carbon to carbon bonds are broken.

40. The method of claim 37, wherein the carbon to carbon bonds remain substantially intact and wherein the sulfur to sulfur bonds are substantially broken.

41. The method of claim 37, wherein the modifying composition generates an active particle with dimensions not more than approximately 10 angstroms.

42. The method of claim 37, wherein the modifying composition generates an active particle that maintains its activity for between approximately 10 and approximately 100 milliseconds.

43. The method of claim 37, wherein after an active particle generated by the modifying composition attaches to polymer macromolecules and the sulfur to sulfur bonds have been broken, the modifying composition prevents chemical structures from appearing in place of the broken sulfur to sulfur bonds.

44. The method of claim 37, wherein a weight of the modifying composition is between approximately 3% and approximately 6% of a weight of the particles of waste rubber.

45. The method of claim 37, wherein a weight of the modifying composition is approximately 5% of a weight of the particles of waste rubber.

46. The method of claim 37, wherein the rubber the modifying composition remains in the modified crushed particles of waste rubber after the method is completed.

47. The method of claim 37, wherein at least approximately 70% of the sulfur to sulfur bonds are broken and wherein no more than approximately 10 to 15% of the carbon to carbon bonds are broken, wherein a weight of the modifying composition represents between approximately 3% and approximately 6% of a weight of the particles of waste rubber and wherein the modifying composition remains in the modified crushed particles of waste rubber after the method is completed.

48. The method of claim 37, wherein the modifying composition generates an active particle with dimensions not more than approximately 10 angstroms, wherein the modifying composition generates an active particle that maintains its activity for between approximately 10 and approximately 100 milliseconds, wherein after an active particle generated by the modifying composition attaches to polymer macromolecules and the sulfur to sulfur bonds have been broken, the modifying composition prevents chemical structures from appearing in place of the broken sulfur to sulfur bonds, wherein at least approximately 70% of the sulfur to sulfur bonds are broken, wherein no more than approximately 10 to 15% of the carbon to carbon bonds are broken, wherein a weight of the modifying composition is between approximately 3% and approximately 6% of a weight of the particles of waste rubber and wherein the modifying composition remains in the modified crushed particles of waste rubber after the method is completed.

49. A raw material for rubber vulcanization comprising de-vulcanized waste rubber in which at least approximately 70% of the sulfur to sulfur bonds that existed prior to de-vulcanization of the waste rubber have been broken, in which less than approximately 10% to 15% of the carbon to carbon bonds that existed prior to de-vulcanization of the waste rubber have been broken, which is stable for at least six months and which may be re-vulcanized by heating to a temperature of approximately 140 degrees Centigrade without adding other ingredients.

50. The raw material of claim 49, which does not re-vulcanize when heated moderately.

51. A raw material for rubber vulcanization comprising de-vulcanized waste rubber in which at least approximately 70% of the sulfur to sulfur bonds that existed prior to de-vulcanization of the waste rubber have been broken, in which less than approximately 10% to 15% of the carbon to carbon bonds that existed prior to de-vulcanization of the waste rubber have been broken, which is stable for at least six months and which may be re-vulcanized by heating to a temperature of approximately 140 degrees Centigrade without adding sulfur, carbon black, tar, mineral oil and/or virgin rubber.

52. The raw material of claim 51, which does not re-vulcanize when heated moderately.

* * * * *